(12) United States Patent
Winter (10) Patent No.: US 10,117,414 B2
(45) Date of Patent: Nov. 6, 2018

(54) ARRANGEMENTS FOR SUPPORTING AN ANIMAL UNDER INVESTIGATION WHILE MONITORING ONE OR MORE BRAIN PROCESSES

(71) Applicant: York Winter, Glienicke (DE)

(72) Inventor: York Winter, Glienicke (DE)

( * ) Notice: Subject to any disclaimer, the term of this patent is extended or adjusted under 35 U.S.C. 154(b) by 245 days.

(21) Appl. No.: 15/093,854

(22) Filed: Apr. 8, 2016

(65) Prior Publication Data

US 2017/0290289 A1    Oct. 12, 2017

(51) Int. Cl.
   *A01K 1/03*      (2006.01)
   *A01K 15/02*     (2006.01)
   *A01K 29/00*     (2006.01)

(52) U.S. Cl.
   CPC ............ *A01K 1/031* (2013.01); *A01K 15/027* (2013.01); *A01K 29/005* (2013.01)

(58) Field of Classification Search
   CPC ........ A01K 1/03; A01K 1/031; A01K 15/027; A01K 29/00; A01K 29/005; A61D 99/00
   USPC .................................. 119/417, 421
   See application file for complete search history.

(56) References Cited

U.S. PATENT DOCUMENTS

| | | | | |
|---|---|---|---|---|
| 3,100,473 A | * | 8/1963 | Kissel | A61B 5/1105 119/421 |
| 4,968,974 A | * | 11/1990 | Sakano | A01K 1/031 119/421 |
| 4,969,417 A | * | 11/1990 | Sakano | A01K 1/031 119/421 |
| 6,062,224 A | * | 5/2000 | Kissinger | A01K 1/031 119/421 |
| 6,279,511 B1 | * | 8/2001 | Loughnane | A01K 1/04 119/421 |
| 8,485,133 B1 | * | 7/2013 | Osmekhin | A01K 1/031 119/416 |
| 2007/0236356 A1 | * | 10/2007 | Zhang | A01K 1/031 340/573.2 |

(Continued)

OTHER PUBLICATIONS

Matsumura et al., "A novel apparatus that permits multiple routes for infusions and body-fluid collections in a freely-moving animal," J. Neursci. Methods Apr. 1995; 57(2):145-49.*

*Primary Examiner* — Lisa L Tsang
(74) *Attorney, Agent, or Firm* — Brian K Dinicola; Dinicola & Young PC (57) ABSTRACT

Mobile platforms and air table arrangements for supporting an animal under investigation include a mobile platform and an underlying air table platform that defines a perforated upper surface and a plurality of apertures in fluid communication with a source of air under pressure. The mobile platform is adapted to glide over the perforated upper surface and includes a base defining an upwardly facing surface and a downwardly facing surface, at least one sidewall circumscribing the upwardly facing surface, and at least one partition wall dimensioned and arranged to divide the downwardly facing surface into a plurality of downwardly facing open compartments. The base defines a first profile having a first maximum dimension, and the perforated upper surface defines a second profile having a second maximum dimension, such that the ratio of the second maximum dimension to the first maximum dimension is less than 2 to 1.

16 Claims, 3 Drawing Sheets

(56) References Cited

U.S. PATENT DOCUMENTS

2013/0255586 A1* 10/2013 Gerashchenko ..... A01K 29/005
　　　　　　　　　　　　　　　　　　　　　　119/421

* cited by examiner

ARRANGEMENTS FOR SUPPORTING AN ANIMAL UNDER INVESTIGATION WHILE MONITORING ONE OR MORE BRAIN PROCESSES

BACKGROUND OF THE INVENTION

Field of the Invention

Embodiments of the present disclosure relate generally to systems and methods to facilitate the investigation, monitoring and/or measurement of brain processes in living laboratory animals such, for example, as rodents.

Description of the Related Art

The brain is the organ that is responsible for motor behavior, perception, cognition and the maintenance of many homeostatic functions. Malfunctions of the brain may be the cause of a variety of neurological and psychiatric diseases and disorders. The function of the brain resides both in the structural connectivity of its network of cells and in the dynamic interactions between these nerve cells. Just as certain cardiovascular diagnostics are best performed on an active heart being challenged by physical exercise, monitoring and measuring techniques for assessing the function and malfunction of brain processes are at their most effective while the brain is engaged in active stimulus processing and motor control. This requires an awake animal actively engaged in behavior.

Various arrangements have been proposed for eliciting activity by an animal under investigation so that one or more functions in the brain of the animal can be measured, assessed or otherwise monitored. Hölscher et al. disclose, in a 2005 paper published in the Journal of Experimental Biology [J. Exp. Biol; Vol. 208, Issue 3, at pp. 561-569], a suspended, spherical treadmill within which an animal is free to walk in different directions while its head is fixed to permit the recording of nerve cell electrical activity and/or other measurements. By moving its feet, the animal under investigation can move the substrate upon which it is supported in any direction or at any angle relative to a reference plane. Such motor behavior can be spontaneous or in response to sensory stimuli or signals, allowing for the experimental presentation of reinforcers. A motivated animal can learn to control the occurrence of reinforcers through decision making and behavioral actions while its brain processes are being monitored and measured.

In U.S. Pat. No. 8,485,133 entitled "Mobile Platform Arrangement" and issued to Osmekhin et al. on Jul. 16, 2013, there is proposed a variation on the Hölscher et al. concept. In the Osmekhin et al. arrangement, however, the movable substrate upon which an animal moves is not a spherical treadmill as proposed by Hölscher et al. Instead, Osmekhin et al. propose a flat-bottomed experimental cage which glides above an underlying air table support surface. Movement of the experimental cage can occur in any horizontal direction or orientation, up until the point at which the animal under investigation contacts the outside wall of the cage. The air table support surface of Osmekhin et al. has a nominal profile dimension (e.g., an outer table surface diameter) that is at least twice as large as the nominal profile dimension of the movable substrate floating above and along the air table support surface.

The inventor herein has recognized that a general disadvantage associated with arrangements of the aforementioned type is the amount of floor or table space which must be exclusively allocated and dedicated to their deployment and use. In many laboratory environments, the researcher(s) may need to reserve space for other equipment and instruments required for a particular set of experiments. A substantial amount of space is also typically required for such activities as animal preparation. In situations where space is limited, the use of conventional arrangements for eliciting animal activity suitable for brain function monitoring may be precluded entirely, necessitate a reduction in efficiency due to the remote placement of other equipment, or reduce the ability of a laboratory to accommodate concurrent investigative activity in related or different fields.

SUMMARY OF THE INVENTION

The aforementioned deficiencies are addressed, and an advance is made in the art, by arrangements for supporting an animal under investigation in a way that elicits activity desirable for the measuring, assessing, analyzing, or otherwise monitoring of brain function(s) in the animal.

In an embodiment, a mobile platform for use in monitoring one or more brain processes of an animal under investigation comprises a base defining an upwardly facing surface and a downwardly facing surface; at least one sidewall circumscribing the upwardly facing surface, the at least one sidewall being dimensioned and arranged to confine an animal supported by the upwardly facing surface during movement of the mobile platform relative to a perforated upper surface of an air table; and at least one partition wall dimensioned and arranged to divide the downwardly facing surface into a plurality of downwardly facing open compartments, wherein the mobile platform is adapted to perform a gliding motion over the perforated upper surface in response to an external acceleration force to the mobile platform.

In a further embodiment, a mobile platform and air table arrangement comprises an air table platform defining a perforated upper surface and a plurality of apertures each in fluid communication with a source of air under pressure to facilitate emission of a constant flow of air; and a mobile platform having a base defining an upwardly facing surface and a downwardly facing surface; at least one sidewall circumscribing the upwardly facing surface, the at least one sidewall being dimensioned and arranged to confine an animal supported by the upwardly facing surface during movement of the mobile platform relative to a perforated upper surface of an air table; and at least one partition wall dimensioned and arranged to divide the downwardly facing surface into a plurality of downwardly facing open compartments, wherein the mobile platform is adapted to perform a gliding motion over the perforated upper surface in response to an external acceleration force to the mobile platform.

In yet another embodiment, a mobile platform and air table arrangement comprises an air table platform defining a perforated upper surface and a plurality of apertures each in fluid communication with a source of air under pressure to facilitate emission of a constant flow of air; and a mobile platform having a base defining an upwardly facing surface and a downwardly facing surface; at least one sidewall circumscribing the upwardly facing surface, the at least one sidewall being dimensioned and arranged to confine an animal supported by the upwardly facing surface during movement of the mobile platform relative to a perforated upper surface of an air table; and at least one partition wall dimensioned and arranged to divide the downwardly facing surface into a plurality of downwardly facing open compartments, wherein the mobile platform is adapted to perform a gliding motion over the perforated upper surface in response to application of an acceleration force to the mobile platform, and wherein the base defines a first profile having a first maximum dimension, wherein the perforated upper surface defines a second profile having a second maximum dimension, and wherein a ratio of the second maximum dimension to the first maximum dimension is less than 2 to 1.

A method for monitoring and measuring brain processes of an animal under investigation comprises installing a mobile platform on a supporting surface of an air table; obtaining and placing an experimental animal onto the mobile platform while the mobile platform is positioned onto the supporting surface of the air table; connecting the experimental animal to one of a head or a body holder; allowing the experimental animal to move the mobile platform around its body; monitoring a gliding movement of the mobile platform while retaining the experimental animal in the head or body holder; and monitoring and measuring at least one brain process of the experimental animal using a head holder to which the experimental animal is connected.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the arrangements are described herein by way of example for several embodiments and illustrative drawings, those skilled in the art will recognize that the methods and systems for supporting an animal under investigation while measuring, assessing, analyzing, or otherwise monitoring brain functions of the animal are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for supporting an animal under investigation while measuring, assessing, analyzing, or otherwise monitoring one or more brain processes. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various arrangements for supporting an animal under investigation while measuring, assessing, analyzing, or otherwise monitoring brain functions of the animal are described. In embodiments consistent with the present disclosure, such arrangements include a mobile or "hovering" platform and a supporting air table platform. The upper surface of the air table is planar and perforated to facilitate the emission of air under pressure. The flow of air provides a friction reducing surface that enables the mobile platform to float or glide along and/or over the upper surface of the air table.

Due to a series of compartments formed on the underside of the mobile platform, this gliding movement may proceed even after a portion of the mobile platform extends beyond a peripheral boundary of the supporting air table platform. As a consequence of the enhanced range of gliding movement obtained by arrangements consistent with the present disclosure, the width or diameter of the air table support surface may be substantially less than twice the width or diameter of the mobile platform. Compact air table arrangements consistent with embodiments of the present disclosure can enable laboratory personnel to perform a wider range of activities and to use different and/or additional investigative equipment than have heretofore been possible, given the same allocation of space and a larger system such, for example, as the one disclosed by Osmekhin et al. in U.S. Pat. No. 8,485,133.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Figure 1:
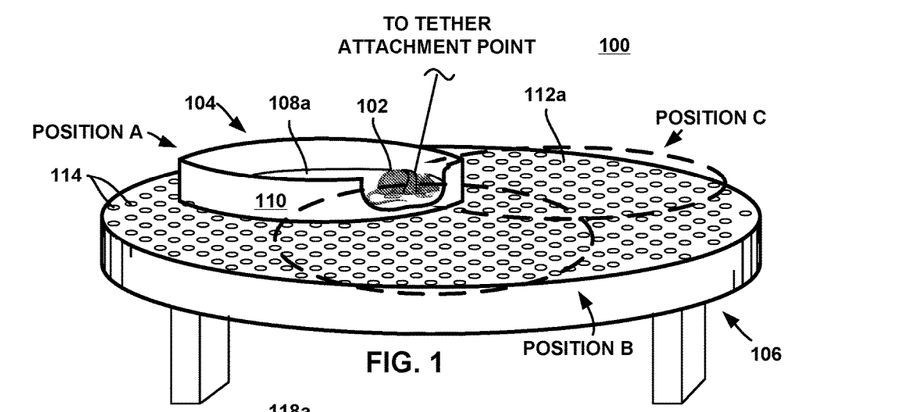
FIG. 1 is a perspective view of a system for eliciting activity by an animal under investigation to facilitate the monitoring of one or more brain processes of the animal in accordance with one or more embodiments of the present invention.

Reference will now be made in detail to exemplary embodiments of the present invention, examples of which are illustrated in the accompanying drawings. Wherever possible, the same reference numbers will be used throughout the drawings to refer to the same or like parts FIG. 1 is a perspective view of an arrangement ("system") 100 for eliciting activity by an animal under investigation 102 to facilitate the monitoring of one or more brain processes of the animal in accordance with one or more embodiments of the present invention. The system 100 includes a floating mobile platform 104 and a supporting air table platform 106.

In embodiments consistent with the present disclosure, the floating mobile platform includes a base having a planar, upwardly facing surface 108a and at least one sidewall 110 which circumscribes the upwardly facing surface 108a. In accordance with the exemplary embodiment of FIGS. 1-4, the floating mobile platform 104 is implemented as a shallow, rigid cylindrical container or dish having a circular profile with an outer diameter $D_1$. The term "outer diameter" refers in this disclosure to the maximum horizontal dimension ("maximum dimension") of the floating mobile platform 104.

Figure 2A:
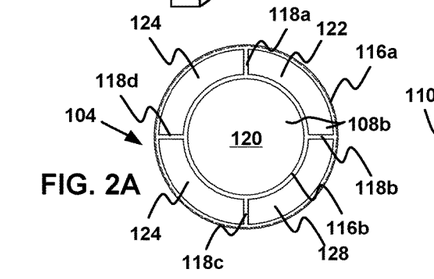
FIG. 2A is a bottom view of a mobile platform constructed in accordance with an exemplary embodiment consistent with the present disclosure.
Figure 2B:
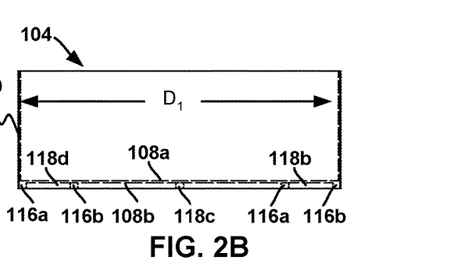
FIG. 2B is an elevation view, in cross section, of the mobile platform depicted in FIGS. 1 and 2A.
Figure 3:
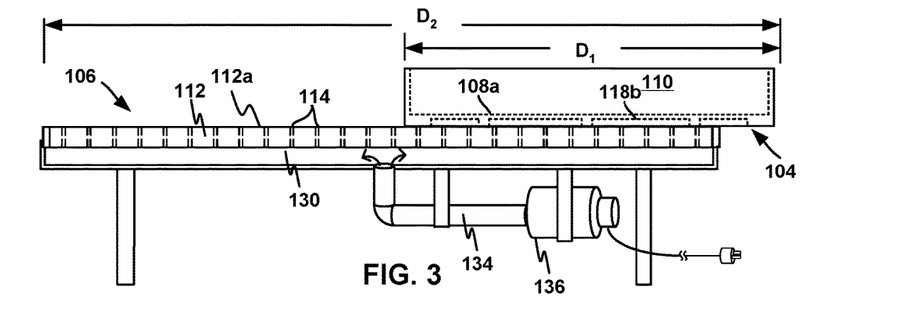
FIG. 3 is an elevation view, in partial cross section, of the system for eliciting activity by an animal under investigation depicted in FIG. 1.

In the exemplary embodiment of FIGS. 1-3, the upwardly facing interior surface 108 of floating mobile platform 102 is surrounded by a single continuous sidewall 110. In accordance with one or more embodiments consistent with the present disclosure, the air table platform 106 is provided with a gliding surface structure 112 that defines an upwardly facing and planar gliding surface 112a. Gliding surface structure 112 is configured as a structural element providing and/or supporting unobstructed gliding motion of the floating mobile platform 104 on/over the surface area defined by the peripheral boundaries of the air table platform 106. The gliding surface 112a of FIG. 1 is thus realized as the top surface of the air table platform 106.

Sidewall 110 is dimensioned and arranged to confine the animal 102 while the animal 102 is supported by the upwardly facing surface 108a (e.g., during movement of the floating mobile platform 104 relative to the upper surface 112a of the supporting air table platform 106). The upper surface 112a of the supporting air table platform 106 is perforated in that it defines a plurality of apertures 114 that are in fluid communication with a source of air under pressure to facilitate emission of a constant flow of air.

The floating mobile platform is adapted to perform a gliding motion over the perforated upper surface 112a in response to a application of an external force to a surface of the floating mobile platform. By way of example, quadrupedal locomotion by the animal under investigation 102 imparts forces upon the upwardly facing surface 108 and the application of such forces results in translation of the floating mobile platform 104 across the perforated upwardly facing upper surface 112a of the supporting air table platform 106.

In accordance with one or more embodiments, the planar supporting surface 112a of the air table platform 106 has a circular profile with an outer diameter $D_2$ that is less than twice the outer diameter $D_1$ of the floating mobile platform 104. In the embodiment of FIGS. 1-3, the air table platform 106 does not have a peripheral barrier surrounding its perforated gliding surface 112a.

In accordance with embodiments consistent with the present disclosure, the base of the floating mobile platform 104 further includes a downwardly facing surface and one or more partition walls dimensioned and arranged to divide the downwardly facing surface into a plurality of downwardly facing open compartments. Each of these compartments is independently capable of generating lift from the impingement of air striking the downwardly facing surface disposed within each compartment.

With particular reference to the cylindrically shaped floating mobile platform configuration of FIGS. 2A and 2B, it will be seen that an outer partition wall indicated generally at 116a and an inner partition wall indicated generally at 116b are formed on and extend downwardly from the downwardly facing surface 108b of base 108. The inner partition wall 116b forms a first compartment 120, while the annular recess formed between outer partition wall 116a and inner partition wall 116b is subdivided, by connecting partition walls 118a-118d, into four radially symmetrical compartments indicated generally at 122, 124, 126 and 128, respectively. Each compartment is formed by a downwardly facing surface portion and the partition walls surrounding it. The term "downwardly facing surface portion" as used herein with regard to the floating mobile platform is intended to refer to a surface of the floating mobile platform which directly faces the perforated upper surface 112a of the air table platform 106 and which is disposed within one of the compartments defined by one or more partition walls.

FIG. 3 is an elevation view, in partial cross section, of the system 100 for eliciting activity by an animal under investigation as depicted in FIGS. 1, 2A, and 2B. The apertures 114 formed in gliding surface structure 112 are in fluid communication with a plenum 130 that receives air under pressure from a suitable source. In the illustrative embodiment of FIG. 3, the source of air under pressure includes an electrically operated air pump 136 coupled to the plenum 130 by one or more fluid connecting links as pipe 134. As the air escapes from plenum 130 via apertures 114, a cushion of air is created which is sufficient to lift the floating mobile platform 104. In their most compact form, systems constructed in accordance with the teachings of the present disclosure utilize no peripheral barrier around the perforated surface of the air table platform and the maximum dimension (e.g., diameter $D_2$) of the perforated surface of the air table platform is less than two times the maximum dimension (e.g., diameter $D_1$) of the floating mobile platform.

Figure 4:
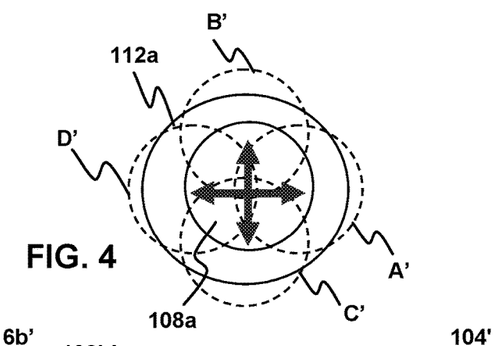
FIG. 4 is top plan view of the system for eliciting activity by an animal under investigation depicted in FIGS. 1 and 3, depicting an exemplary range of motion by mobile platform relative to the underlying air table support surface in accordance with one or more embodiments.

FIG. 4 is top plan view of the system 100 depicted in FIGS. 1 and 3, and illustrates the range of motion by mobile platform relative to the underlying air table support surface when the animal under investigation is suitably tethered in accordance with one or more embodiment. While the position of animal relative to the underlying support surface 112a of air table platform 106 does not vary with movement of the floating mobile platform 104 upon which the animal is standing, the floating air table platform 104 itself is free to move in reaction to the forces applied by quadrupedal movements of the animal.

If, for example, the animal's movements are such that the animal would normally be propelled, if unencumbered by harness or head fixture, toward the location identified as A' in FIG. 4, the actual movement of the floating mobile platform from the initial location (shown in solid line form) would be toward the location identified as C' in FIG. 4. Likewise, if the animal's movements are such that the animal would normally be propelled, if unencumbered by harness or head fixture, toward the location identified as B' in FIG. 4, the actual movement of the floating mobile platform from the initial location (shown in solid line form) would be toward the location identified as D' in FIG. 4. In each case, attachment of the animal to a harness or a head fixation system is sufficient to prevent the floating mobile platform from extending so far beyond the peripheral edge of gliding surface 112a that the floating mobile platform could fall over the edge.

Figure 5A:
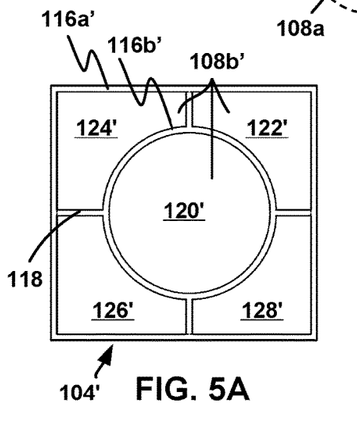
FIG. 5A is a bottom view of an exemplary mobile platform constructed in accordance with a further embodiment consistent with the present disclosure.
Figure 5B:
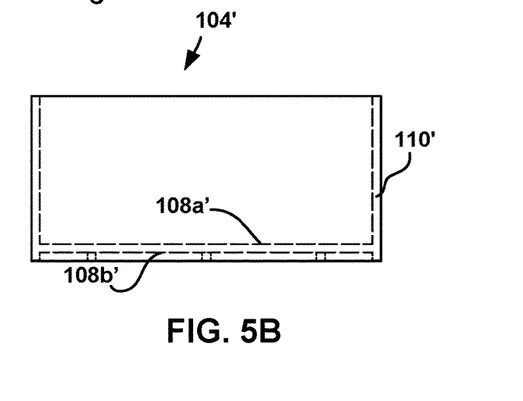
FIG. 5B is an elevation view, in cross section, of the exemplary mobile platform depicted in FIG. 5A.

FIGS. 5A and 5B depict an alternate embodiment of a floating mobile platform 104' consistent with the present disclosure. FIG. 5A is a bottom plan view of the floating mobile platform 104' while FIG. 5B is an elevation view, in cross section, of the exemplary mobile platform depicted in FIG. 5A. With particular reference to FIG. 5A, it will be seen that the bottom surface 118b' is subdivided into five, downwardly facing open compartments indicated generally at 120', 122', 124', 126' and 128' by an inner partition wall 116b' having a circular cross sectional profile, an outer partition wall 116a' having a generally rectangular (e.g., square) cross sectional profile, and a plurality of connector partitions 118.

Figure 6:
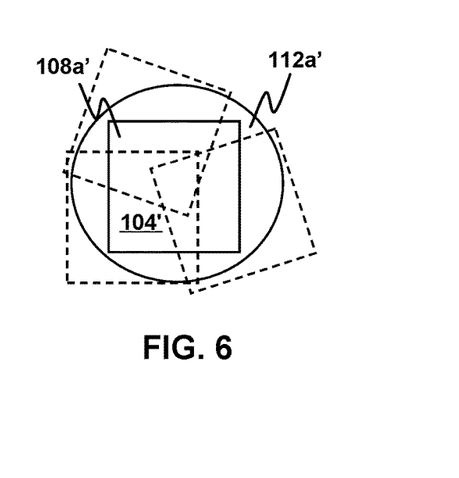
FIG. 6 is a top plan view of a system for eliciting activity by an animal under investigation, depicting an exemplary range of motion by the mobile platform of FIGS. 5A and 5B relative to an underlying air table support surface in accordance with one or more embodiments.

FIG. 6 is a top plan view of a system for eliciting activity by an animal under investigation supported by floating mobile platform surface 108a'. The system depicted in FIG. 6 exemplifies the range of relative motion between the floating mobile platform 104' of FIGS. 5A and 5B and the underlying air table support surface 112a' in accordance with one or more embodiments consistent with the present disclosure.

Figure 7A:
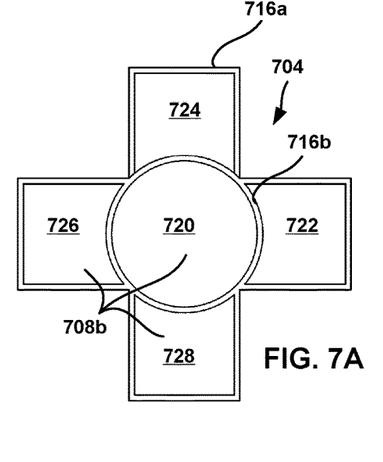
FIG. 7A is a bottom view of an exemplary mobile platform constructed in accordance with a further embodiment consistent with the present disclosure.
Figure 7B:
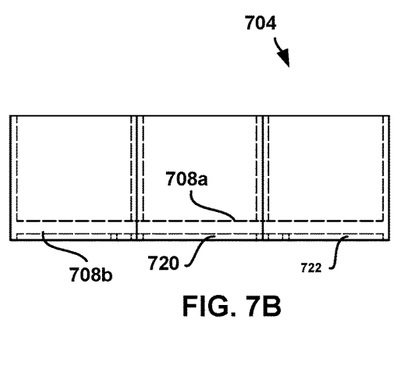
FIG. 7B is an elevation view, in cross section, of the exemplary mobile platform depicted in FIG. 7A.

FIGS. 7A and 7B depict yet another embodiment of a floating mobile platform 704 consistent with the present disclosure. FIG. 7A is a bottom plan view of the floating mobile platform 704 while FIG. 7B is an elevation view, in cross section, of the exemplary mobile platform depicted in FIG. 7A. With particular reference to FIG. 7A, it will be seen that the bottom surface 718b is subdivided into five, downwardly facing open compartments indicated generally at 720, 722, 724, 726 and 728 by an inner partition wall 716b having a circular cross sectional profile, and an outer partition wall 716b consisting of four U-shaped segments joined together at points of contact with the inner partition wall. The result is four, symmetrically and radially extending outer compartments arranged about a central compartment.

It will be readily appreciated that in each of the foregoing embodiments, one or two of the outer compartments, at most, may overhang the peripheral edge of the gliding surface 112a of the air table platform 106 (each, as shown in FIG. 1). The compartments, as compartments 720 to 728 of FIGS. 7A and 7B are dimensioned and arranged, and the material selection of the floating platform is such that sufficient lift is developed by the cushion of air present under the non-overhanging compartments as to facilitate continued gliding motion of the floating mobile platform, as floating mobile platform 704 of FIGS. 7A and 7B (e.g., to permit movement of the floating mobile platform back across the gliding surface of the air table platform as the animal under investigation reverses or changes direction).

Figure 8:
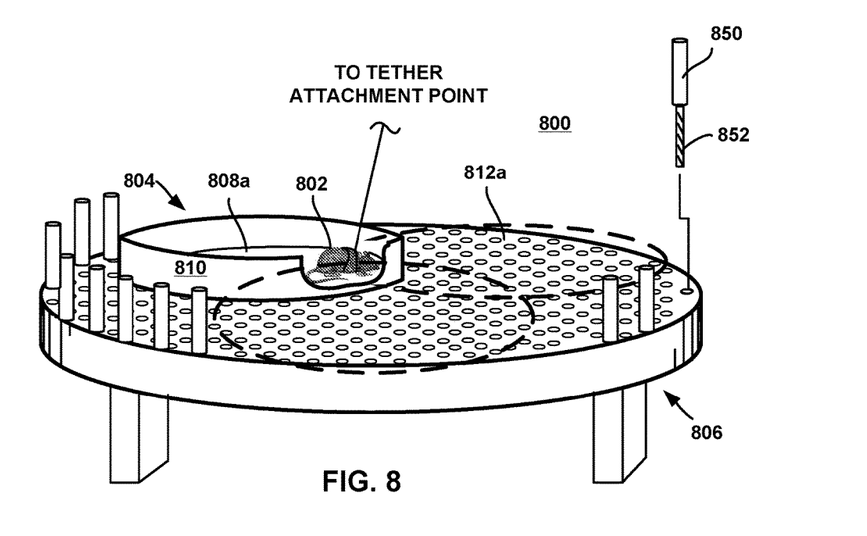
FIG. 8 is a perspective view of a further embodiment of a system for eliciting activity by an animal under investigation to facilitate the monitoring of one or more brain processes of the animal.

FIG. 8 is a perspective view of a further embodiment of a system 800 for eliciting activity by an animal under investigation 802 to facilitate the monitoring of one or more brain processes of the animal. As in the embodiment of FIGS. 1-4, the system 800 includes a floating mobile platform 804 having a base which defines an upwardly facing, planar animal supporting surface 808a and one or more downwardly facing, open compartments (not shown). One or more sidewalls 810 extend upwardly proximate the peripheral edge of the upwardly facing surface 808a so as to completely surround the animal 802. The system 800 further includes a supporting air table platform 806 which defines an upwardly facing perforated gliding surface 812a for maintaining a cushion of air beneath the floating mobile platform.

The inventor herein has recognized that the provision of a partial barrier along one or more edge regions of the perforated gliding surface may be desirable to prevent the floating mobile platform from, for example, impacting upon sensitive equipment or instruments in the areas adjacent the system 800. To this end, system 800 is configured to accommodate installation of a barrier feature for restricting movement of the floating mobile platform 804 beyond selectable edge regions of the perforated gliding surface 812a. In the exemplary embodiment of FIG. 8, a partial barrier may be implemented at any point along the gliding surface periphery by installing a plurality of vertical posts, indicated generally at 850, into corresponding apertures defined at regular intervals along the peripheral boundary of the air table. In an embodiment, the apertures are internally threaded for mating engagement with a threaded extension 852 which depends from each post 850. Other barrier configurations, such as continuous panel sections, are also deemed by inventor herein to be well within the scope of the present disclosure. It suffices to say that a variety of partial barrier configurations may be implemented without departing from the spirit and scope of the present disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

All examples described herein are presented in a non-limiting manner. Various modifications and changes may be made as would be obvious to a person skilled in the art having benefit of this disclosure. Accordingly, plural instances may be provided for components described herein as a single instance. Boundaries between various components are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A mobile platform for use in monitoring one or more brain processes of an animal under investigation, comprising:
    a base defining an upwardly facing surface and a downwardly facing surface;
    at least one sidewall circumscribing the upwardly facing surface, the at least one sidewall being dimensioned and arranged to confine an animal supported by the upwardly facing surface during movement of the mobile platform relative to a perforated upper surface of an air table; and
    at least one partition wall dimensioned and arranged to divide the downwardly facing surface into a plurality of downwardly facing open compartments, wherein the mobile platform is adapted to perform a gliding motion over the perforated upper surface in response to an external acceleration force to the mobile platform; and wherein the at least one partition wall is dimensioned and arranged so that extension of a first of the plurality of downwardly facing open compartments to overhang beyond a peripheral edge of the perforated upper surface does not diminish a lifting force imparted by air impinging on a downwardly facing surface portion of one or more non-overhanging, downwardly facing open compartments of the plurality of downwardly facing open compartments, whereby sufficient lift is developed by a cushion of air present under the one or more non-overhanging, downwardly facing open compartments to facilitate continued gliding motion of the mobile platform;

wherein the at least one partition wall and the at least one sidewall each extend downwardly such that a bottom end of the at least one partition wall and a bottom end of the at least one sidewall are in a common horizontal plane.

2. The mobile platform of claim 1, wherein the at least one sidewall comprises a single unitary side wall.

3. The mobile platform of claim 2, wherein the base has a circular profile.

4. The mobile platform of claim 1, wherein the at least one sidewall comprises a plurality of sidewalls and wherein the base has a polygonal profile.

5. The mobile platform of claim 1, wherein the base defines a first profile having a first maximum dimension, wherein the perforated upper surface defines a second profile having a second maximum dimension, and wherein a ratio of the second maximum dimension to the first maximum dimension is less than 2 to 1.

6. A mobile platform and air table arrangement, comprising:

an air table platform defining a perforated upper surface and a plurality of apertures each in fluid communication with a source of air under pressure to facilitate emission of a constant flow of air; and a mobile platform having
    a base defining an upwardly facing surface and a downwardly facing surface;
    at least one sidewall circumscribing the upwardly facing surface, the at least one sidewall being dimensioned and arranged to confine an animal supported by the upwardly facing surface during movement of the mobile platform relative to a perforated upper surface of an air table; and
    at least one partition wall dimensioned and arranged to divide the downwardly facing surface into a plurality of downwardly facing open compartments, wherein the mobile platform is adapted to perform a gliding motion over the perforated upper surface in response to an external acceleration force to the mobile platform, and wherein the at least one partition wall is dimensioned and arranged so that extension of a first of the plurality of downwardly facing open compartments to overhang beyond a peripheral edge of the perforated upper surface does not diminish a lifting force imparted by air impinging on a downwardly facing surface portion of one or more non-overhanging, downwardly facing open compartments of the plurality of downwardly facing open compartments, whereby sufficient lift is developed by a cushion of air present under the one or more non-overhanging, downwardly facing open compartments to facilitate continued gliding motion of the mobile platform;

wherein the at least one partition wall and the at least one sidewall each extend downwardly such that a bottom end of the at least one partition wall and a bottom end of the at least one sidewall are in a common horizontal plane.

7. The arrangement of claim 6, wherein the air table platform further includes a barrier partially circumscribing the perforated upper surface, the barrier defining at least one gap dimensioned and arranged to allow extension of a portion of the mobile platform.

8. The arrangement of claim 6, wherein the at least one sidewall comprises a single unitary side wall.

9. The arrangement of claim 8, wherein the base has a circular profile.

10. The arrangement of claim 6, wherein the at least one sidewall comprises a plurality of sidewalls and wherein the base has a polygonal profile.

11. The arrangement of claim 10, wherein the perforated upper surface has a circular contour.

12. The arrangement of claim 6, wherein the base defines a first profile having a first maximum dimension, wherein the perforated upper surface defines a second profile having a second maximum dimension, and wherein a ratio of the second maximum dimension to the first maximum dimension is less than 2 to 1.

13. The arrangement of claim 6, wherein the air table platform further includes no side wall for circumscribing the perforated upper surface, whereby a maximum extension of the mobile platform beyond a peripheral edge of the perforated upper surface is controlled by at least one of increased friction or a restraint flexibly coupling the animal under experimental investigation to a stationary mounting location.

14. A mobile platform and air table arrangement, comprising:

an air table platform defining a perforated upper surface and a plurality of apertures each in fluid communication with a source of air under pressure to facilitate emission of a constant flow of air; and a mobile platform having
    a base defining an upwardly facing surface and a downwardly facing surface;
    at least one sidewall circumscribing the upwardly facing surface, the at least one sidewall being dimensioned and arranged to confine an animal supported by the upwardly facing surface during movement of the mobile platform relative to a perforated upper surface of an air table; and
    at least one partition wall dimensioned and arranged to divide the downwardly facing surface into a plurality of downwardly facing open compartments, wherein the mobile platform is adapted to perform a gliding motion over the perforated upper surface in response to application of an acceleration force to the mobile platform, wherein the base defines a first profile having a first maximum dimension, wherein the perforated upper surface defines a second profile having a second maximum dimension, and wherein a ratio of the second maximum dimension to the first maximum dimension is less than 2 to 1;

wherein the air table platform further includes a barrier for partially circumscribing the perforated upper surface, the barrier defining at least one gap dimensioned and arranged to allow extension of a portion of the mobile platform relative to the perforated upper surface; and wherein the at least one partition wall is dimensioned and arranged so that extension of a first of the plurality of downwardly facing open compartments to overhang beyond a peripheral edge of the perforated upper surface does not diminish a lifting force imparted by air impinging on a downwardly facing surface portion of one or more non-overhanging, downwardly facing open compartments of the plurality of downwardly facing open compartments, whereby sufficient lift is developed by a cushion of air present under the one or more non-overhanging, downwardly facing open compartments to facilitate continued gliding motion of the mobile platform;

wherein the at least one partition wall and the at least one sidewall each extend downwardly such that a bottom end of the at least one partition wall and a bottom end of the at least one sidewall are in a common horizontal plane.

15. The arrangement of claim 14, whereby a maximum extension of the mobile platform through the at least one gap and beyond a peripheral edge of the perforated upper surface is determined by at least one of increased friction or a restraint flexibly coupling the animal under experimental investigation to a stationary mounting location.

16. The arrangement of claim 14, wherein the barrier is defined by a plurality of posts arranged proximate a peripheral edge of the perforated upper surface.

\* \* \* \* \*